United States Patent [19]

Harsdorff

[11] Patent Number: 5,114,248

[45] Date of Patent: May 19, 1992

[54] BEARING FOR A SHAFT MEMBER OR THE LIKE

[75] Inventor: Ortwin Harsdorff, Zell, Fed. Rep. of Germany

[73] Assignee: SKF GmbH, Schweinfurt, Fed. Rep. of Germany

[21] Appl. No.: 665,260

[22] Filed: Mar. 6, 1991

[30] Foreign Application Priority Data

Mar. 13, 1990 [DE] Fed. Rep. of Germany ....... 4007881

[51] Int. Cl.⁵ .............................................. F16C 19/38
[52] U.S. Cl. .................................... 384/473; 384/474; 384/571
[58] Field of Search ............... 384/571, 473, 474, 462, 384/484, 477

[56] References Cited

U.S. PATENT DOCUMENTS

| | | | |
|---|---|---|---|
| 1,676,894 | 7/1928 | Frank | 384/474 |
| 3,432,215 | 3/1969 | Seay | 384/473 |
| 4,882,950 | 11/1989 | Gausrab et al. | 384/571 |
| 4,958,941 | 9/1990 | Imanari | 384/474 |

Primary Examiner—Lenard A. Footland
Attorney, Agent, or Firm—Eugene E. Renz, Jr.

[57] ABSTRACT

A bearing assembly for a shaft mounting in a bore of a housing which comprises an outer ring having two outer raceways for inner and outer rows of rolling elements. The outer ring includes a seating surface section seated in the through-bore and a radially outward-direction flange section, a cover having a contact surface of a ring-shaped flange for sealing off the roller bearing on the outside, and at least one oil bore in the outer ring between the two outer raceways. The oil bore extends radially from the outside toward the inside to a reservoir for the rolling elements to supply or carry away a lubricant to or from the reservoir. The outer ring also has a lateral surface section of a ring-shaped extension carrying the outside outer raceway. This lateral surface section is adjacent to the outside end surface of the flange section of the outer ring. The inner surface of a centering extension is tightly seated on the ring-shaped extension. This centering extension is adjacent to the outside surface of the ring-shaped flange of the cover and each oil bore is located between the outside end surface of the flange section and the lateral surface section on the circumference of the outer ring. Each of the oil bores opens at its radially outer end into a connecting channel between the flange section of the outer ring and the ring-shaped flange of the cover. This connecting channel extends in an essentially radial direction.

10 Claims, 4 Drawing Sheets

BEARING FOR A SHAFT MEMBER OR THE LIKE

FIELD OF THE INVENTION

The present invention relates to improvements in bearings supporting shafts carrying pinion gears or the like.

BACKGROUND OF THE INVENTION

The construction and arrangement of prior bearings of the type to which the present invention relates have certain disadvantages and drawbacks. For example, British Patent No. 923451 shows an arrangement wherein the flange section of the outer ring of the bearing is located on one end of the outer ring facing away from the pinion so that oil bores passing radially through the outer ring between the two external raceways and opening out into a reservoir can be connected to corresponding feed or drain channels of the gear housing. This arrangement presents certain disadvantages and drawbacks. For example, the outer raceway in the region adjacent to the inside of the outer ring, that is, the raceway portion adjacent to the pinion and under the most severe load is supported by a ring shaped section located a certain distance away from the flange section of the outer ring and is designed with relatively thin walls. By reason of the configuration, there is a danger that this outer raceway section on the inside end can skew slightly and be displaced in the through bore of the housing by reason of deformation of the ring shaped section caused by the rolling load or the press fit forces created during assembly. Displacement of the outer raceway on the inside end is harmful and should be avoided because it interferes with the proper engagement of the pinion with the ring gear of the transmission. Displacements of this type are particularly dangerous in assemblies utilizing conical rolling elements, since they are particularly sensitive to skewing.

SUMMARY OF THE INVENTION

With the foregoing in mind, it is the object of the present invention to provide an improved bearing for a shaft mounting a pinion which is characterized by novel features of construction and arrangement which avoids the problems cited above associated with the prior art. To this end, an object of the present invention is to provide a bearing configured in such a manner to make it possible to mount the outer raceway on the inside end of the outer ring through the bore of the housing in an especially rigid manner. Additionally, the outer ring is provided with oil bores which can be easily connected to feed drain channels which oil bores lead between two outer raceways to the reservoir.

By this construction, the flange section of the outer ring is located either radially over the outer raceway on the inside end or in the immediate vicinity of this outer raceway region. Thus the outer raceway section on the inside end, which is the raceway subjected to the greatest load, is considerably rigidified or stiffened by the flange section so that the raceway can not give way during operation, even under high loads. Furthermore, by providing at least one oil bore in the outer ring, the inner radial end of the bore opens out into the reservoir whereas its outer radially end opens into a relatively easy to fabricate connecting channel between the ring shape flange of the cover in the flange section of the outer ring.

Since the oil bore is located in a thin walled region of the outer ring, it is relatively short and thus it can be worked easily and economically into the outer ring by a conventional process such as drilling, for example.

The present invention incorporates other more specific features providing functional advantages over the prior art. For example, the connecting channel of the oil bore may be formed by a groove in the ring-shaped flange of the cover and/or of the flange section of the outer ring. This groove can be worked or stamped into the ring-shaped flange or flange section without the need for a cutting process which means that the outer ring in the cover can be mass produced very economically.

In accordance with another feature of the present invention, the connecting channel is bounded in the circumferential direction by a pair of sidewalls of a radially oriented continuous axial slot in a sealing disk clamped between the outside end surface of the flange section of the outer ring, and the inside contact surface of the ring-shaped flange of the cover and in the axial direction by the outside end surface and inside contact surface. By this construction, the connecting channel of the oil bore is formed by a slot in a sealing ring. The sealing ring can be flat, and consists of an elastically compressible plastic such as BUNA. The sealing ring can be clamped between the end surface of the flange section of the outer ring and the ring shaped flange of the cover. By this construction, each connecting channel is secured against leakage of lubricant from the connecting channel in the circumferential direction. When the slot of the sealing ring is closed toward the outside, the connecting channel is also sealed off at its outer radial end by the sealing ring.

In some applications such as in a rear wheel drive transmission of a motor vehicle, the drive pinion shaft is disposed essentially in a horizontal position. In this environment, at least one connection channel can open out into its upper end into an axial bore in the flange section of the outer ring. The axial bore can then lead to a conventional oil feed channel in the housing. In a configuration of this type, the transmission oil flows downward by itself from the feed channel via the axial bore, the associated connecting channel and the continuing or following oil bore, and into the reservoir.

In accordance with another feature of the present invention, a connecting channel may be provided at a location on the bottom circumference on the outer ring with an essentially downward vertical orientation so that excess lubricant can flow back from the reservoir through the oil drain opening, the connecting channel, and an axial bore in the flange section into an oil drain channel in the housing, and from there back from the transmission.

In accordance with still another feature of the present invention, excess lubricant may be conducted from the reservoir through a lower oil bore worked into the outer ring and into the following connecting channel.

In accordance with another embodiment of the present invention, the oil drain opening is formed by a groove passing continuously in the axial direction from the outer axial end of the outer ring as far as the radially inner edge of the outer axial end surface of the flange section of the outer ring, between the inner surface of the centering extension of the cover, and the lateral section of the ring shape extension of the outer ring. This configuration provides the advantage that excess lubricant located on the outside end of the reservoir passes through the groove between the centering extension of the cover and the lateral surface section of the outer ring to the lower connecting channel and can flow back from there via the axial bore in the flange section to the transmission.

BRIEF DESCRIPTION OF THE DRAWINGS

These and other objects of the present invention and the various features and details of the operation and construction thereof are hereinafter more fully set forth with reference to the accompanying drawings, where.

DETAILED DESCRIPTION OF THE PREFERRED EMBODIMENT

Figure 1:
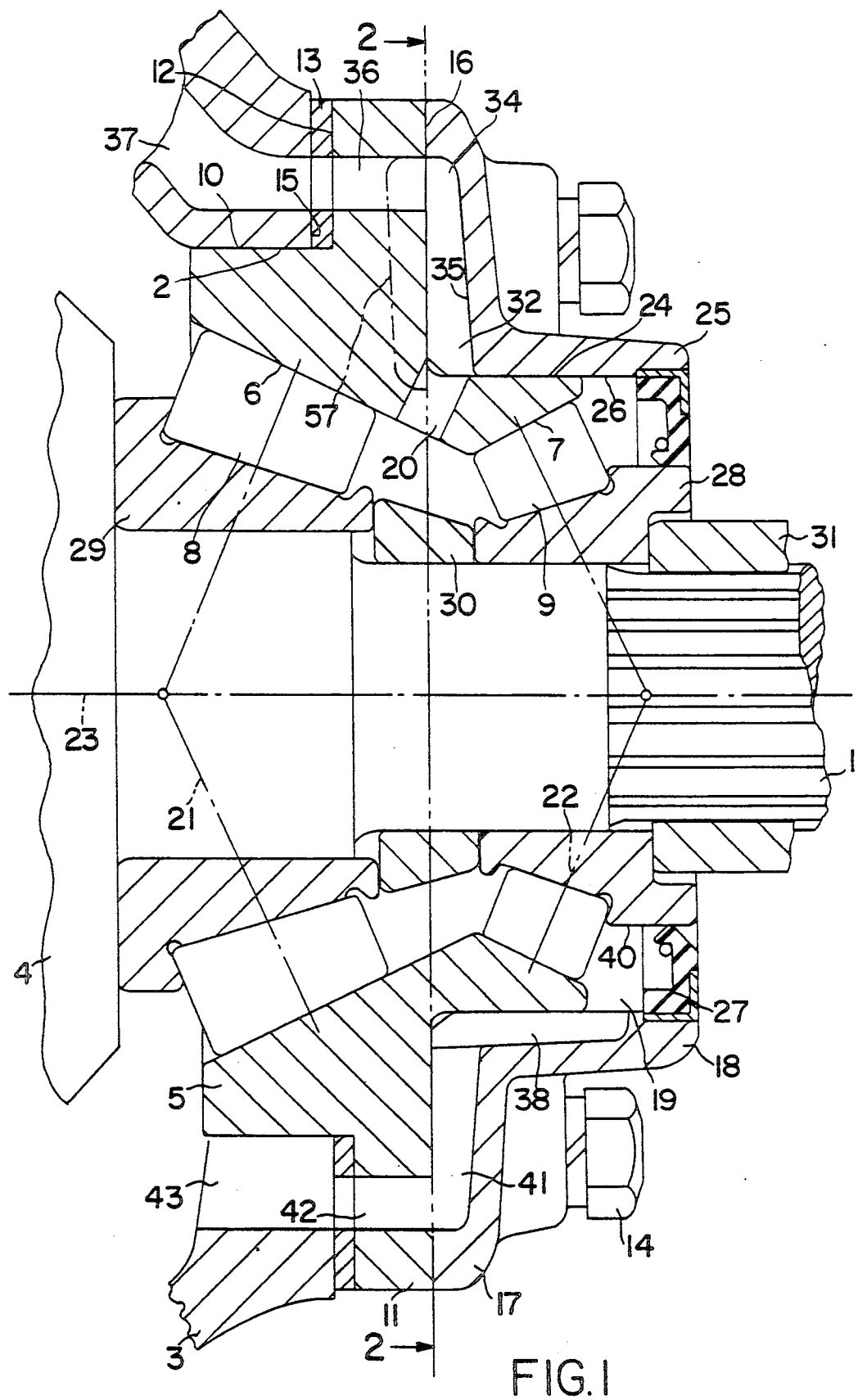
FIG. 1 is a transverse sectional view through a bearing for a shaft incorporating a lubricant flow system in accordance with the present invention.

Referring now to the drawings and particularly to FIG. 1 thereof, there is shown a bearing constructed in accordance with the present invention mounted on a horizontal shaft 1 which extends in a through-bore 2 of a housing 3 in which a motor vehicle rear wheel drive transmission (not shown) is installed.

The shaft is journaled in the housing 3 by a bearing assembly in accordance with the present invention including a roller bearing having an outer ring 5 and two adjacent conical angularly disposed outer raceways 6 and 7 in its bore. The inside outer raceway 6 is located adjacent to pinion 4 and the outside outer raceway 7 is located a predetermined distance from the pinion toward the spline end of the shaft. The bearing includes inside and outside rows $R_i$ and $R_o$ of rollers 8 and 9 respectively. The outer raceways 6 and 7 are angularly disposed so that the rollers 8 and 9 have lines of force depicted as reference lines 21 and 22 which diverge from each other at an angle with respect to the rotational axis 23 of the shaft 1.

The bearing also includes a pair of axially spaced, separate inner rings 28 and 29 separated by a spacer ring 30 engaging the confronting axial end faces of inner rings 28 and 29. The inner row $R_i$ of rolling elements 8 bears the greater load of the tooth engaging forces of pinion 4. The inside inner raceway 29a is of a larger diameter than the outside inner raceway 28a. The inside inner ring 29 is supported axially on a ring shaped enlarged shoulder 1a of shaft 1 adjacent the pinion 4. A hub 31 engaging on the spline portion of the shaft 1 serves to clamp the outside inner ring 28 via spacer ring 30 and the inside inner ring 29, against the ring shaped enlarged shoulder 1a of shaft 1 and thus holds it axially in place on shaft 1. The outer ring 5 has a peripherally extending seating surface 10 confronting the through-bore 2 of the housing 3, and a radially outwardly directed flange section 11 projecting radially outwardly from the seating surface 10. The flange section 11 has a flat axial inner end face 12 which seats against a radially directed support surface 15 of the housing 3 by means of cap screws 14 and interposed calibrated shims 13.

The flange section 11 also has a flat planar outside axial end surface 16 on which a ring shape flange 17 of a cover 18 is attached by suitable fasteners, such as screws 14. The cover 18 serves as the outside seal of a reservoir 19 for the rolling elements 8 and 9 of the rolling bearing. Lubricant for the transmission is supplied to reservoir 19 via an oil bore 20 in the outer ring 5 which extends radially from the outside toward the inside and is located between the outer raceways 6 and 7. The oil bore 20 is located at an upper circumferential point of the outer ring 5 so that it extends in essentially a vertical direction and leads between the two rows of rolling elements 8 and 9 to the reservoir 19.

The cover 18 has a hub-like inner centering extension 25 having an inner peripheral surface 26 conforming closely and seating in an oil-tight manner on the lateral exterior surface 24 of the outer section 5a of the outer ring 5.

Figure 2:
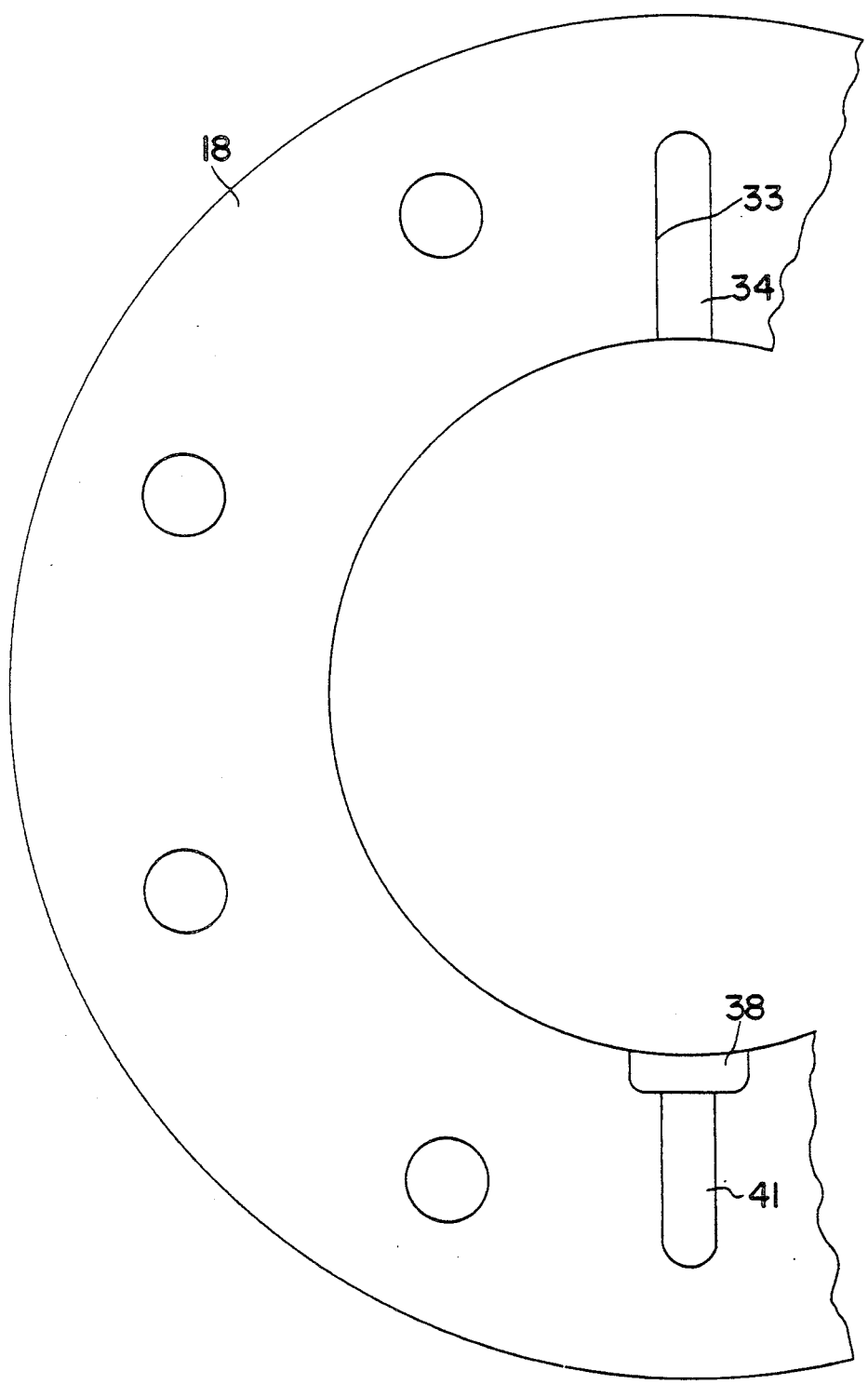
FIG. 2 is an enlarged fragmentary sectional view taken along lines 2—2 of FIG. 1 showing the inner axial end face of the ring shaped flange of the cover in the disassembled state.

As best illustrated in FIG. 1, the outer end of the oil bore 20 opens into a finger-like radially extending connecting channel 32 located between the flange section 11 of the outer ring 5 and the ring-shaped flange 17 of cover 18. The connecting channel 32 is bounded in the circumferential direction by sidewalls 33 of a radial groove 34 formed in the contact surface of the ring-shaped flange 17 (see FIG. 2). This groove 34 may be integrally formed in the cover during the manufacture of the cover which is typically made of cast iron by a casting process. In the axial direction, the connecting channel 32 is bounded by a bottom surface 35 of the groove 34 and the opposing outside end surface 16 of flange section 11. In this illustrated embodiment, the shaft 1 is horizontally disposed whereby the oil bore 20, which serves to supply transmission oil to reservoir 19, is located at an upper circumferential region of outer ring 5. Connecting channel 32 communicates at its upper radial end with an axial bore 36 extending through the flange section 11 connected at its inner end to a lubricant feed channel 37 in the housing 3. A lubricant drain opening is located in a lower circumferential region of the outer ring 5 which extends from the reservoir 19 to an oil drain channel 43 in housing 3. More specifically, in the embodiment illustrated in FIG. 1, the drain opening is formed by an axial groove 38 located between inner surface 26 of the centering extension 25 and a lateral surface section 24 of the ring-shaped extension. As illustrated, groove 38 is formed in the inner peripheral surface 24 of pilot section 25 of cover plate 18. The groove 38 extends continuously in the axial direction from the outer axial end from the inner ring 5 to the axial end face 16 of flange section 11.

A sealing ring 27 is seated in the bore 26 of pilot section 25 which is located a predetermined axial distance from the outer axial end face of the inner ring 5 so that the outside end of groove 38 passes between the end of outer ring and sealing ring 27 to open into reservoir 19. Sealing ring 27 has a sealing lip biased on the land surface 40 of the outside inner ring 28 by a helical spring and thus seals off reservoir 19 from the outside. The groove 38 opens at its inner end into a second radial connecting channel 41 located between the flange section 11 and ring shaped flange 17 of cover 18. The second connecting channel 41 is formed by a radial groove in the contact surface 17a of ring shaped flange 17 of cover 18. At its outer end, groove 41 communicates with an axial bore 42 extending through flange section 11 and the adjacent shims 13 to communicate with the lubricant drain channel 43 in the housing 3.

Figure 3:
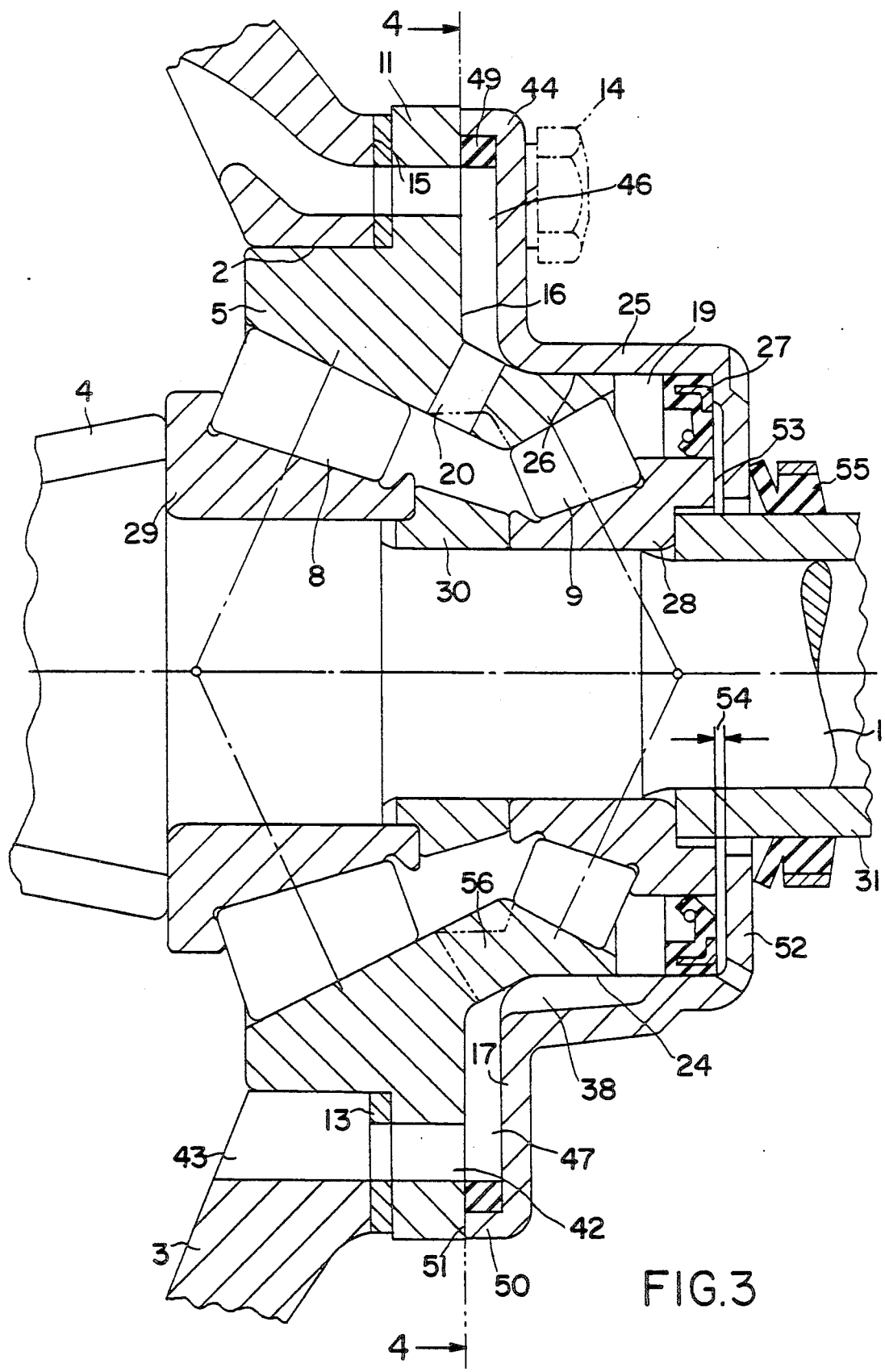
FIG. 3 is a transverse sectional view similar to FIG. 1 showing another embodiment of a bearing and lubricant system constructed in accordance with the present invention.
Figure 4:
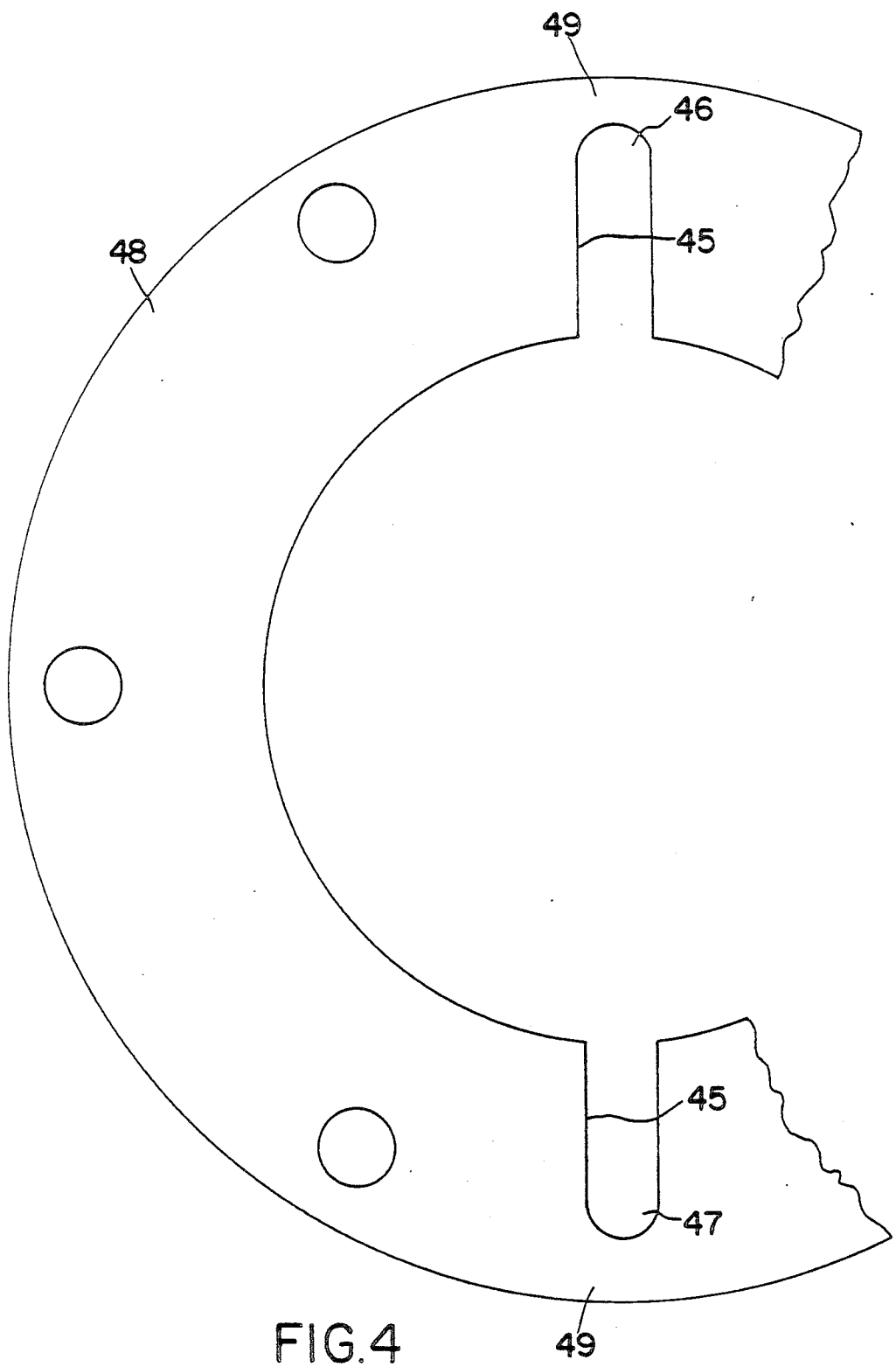
FIG. 4 is an enlarged sectional view taken along lines 4—4 of FIG. 3 showing the inner axial end surface of the sealing ring in the disassembled state.

There is shown in FIGS. 3 and 4 a modified bearing for journaling a shaft 1 in through-bore 2 of the housing 3 which is generally similar to the previously described embodiment.

Thus the bearing in FIG. 3 includes inner and outer rows $R_i$ and $R_o$ of conical rollers 8 and 9 respectively, a common outer ring 5 having angularly disposed outer raceways 6 and 7 and a pair of inner rings 28 and 29 mounted on hub of shaft 1. Cover 44 includes a centering section 25 snugly seated on lateral axial surface section 24 of the outer ring 5.

An oil bore 20 is formed in the outer ring 5 which opens into a connecting channel 46 located between axial flange section 11 of the outer ring 5 and the ring shaped flange 17 of cover 44 to supply lubricant from the transmission to a reservoir 19. A second connecting channel 47 carries lubricant between ring shaped flange 17 and flange section 11.

In accordance with this embodiment, the two connecting channels 46 and 47 are bounded in the circumferential direction by two sidewalls 45 of one of the two radial slots in a sealing ring 48. As illustrated in FIG. 4, the slots are formed in a flat sealing ring 48 and extend axially through the ring. Ring 48 is preferably made of a flexible, resilient material such as plastic and is clamped between the outer axial end face 16 of flange section 11 and the inner contact surface 44a of cover 44. The connecting channels 46 and 47 as illustrated are formed by slots bounded in the axial direction by the outer end surface 16 of flange section 11 and the inner contact surface 44a of cover 44. The slots as illustrated open radially inwardly and are closed by an outer edge section 49 of sealing ring 48. The outer peripheral edge of sealing ring 48 seats in the interior or collar section 50 of the cover 44 which is bent inwardly toward the outside end face 16 of the flange section 11. The outer terminal edge 51 of the collar 50 abuts the end surface 16. Cap screws 14 fix cover 44 in flange section 11 axially in position on support surface 15 of housing 3 via the inner position of calibrated shims 13.

Cover 44 may be formed from sheet steel by pressing and/or drawing to the shape illustrated, including an axial groove 38 located between the inner surface 26 of the centering extension 25 and the lateral surface section 24. The cover 44 includes a radially inwardly directed shoulder 52 spaced a predetermined axial distance 54 from the outer end face 53 of the outside inner ring 28. The space 54 provides a means of venting the space between the seals 27 and 55 to the atmosphere via a venting port in the lower portion between shoulder 52 and seal 27. In this manner condensation which might accumulate in the space between the seals 27 and 55 can drain to the outside. Axial sealing ring 55, having a flexible sealing lip 55a mounted on hub 31, engages the outer face of shoulder 52 to provide a seal.

The bearing assembly is a self-contained unit which can be preassembled before it is seated on the shaft 1 and inserted into the through-bore 2 of housing 3. To this end, the rolling elements 9 together with the outside inner ring 28 are pushed into the bore of the outer ring 5 and engage with outer raceway 7. Thereafter, the centering extension 25 of the cover 44, together with the installed sealing ring 48 and sealing ring 27, are pushed onto lateral surface 24, and the ring shaped flange 17 of the cover 44 is fixed in place on axial end face 16 of flange section 11 by means of two screws 14.

The outside inner ring 28 is held in place on the outer ring 5 by its end surface on hub 31 and by way of rolling elements 9.

If desired, it is also possible to attach intermediate ring 30 and the inside inner ring 29 to the outside inner ring 28 by bonding their end faces together, or by seating them on a mounting bushing to form a complete roller bearing unit including the two rows of rolling elements 8 and 9.

Even though particular embodiments of the invention have been illustrated and described herein, it is not intended to limit the invention and changes and modifications may be made therein within the scope of the following claims. For example, even though the oil drain as illustrated in FIG. 1 is formed by an axial groove 38 between centering extension 25 of cover 18 and the ring shaped extension of outer ring 5, it can also be formed by an oil bore 56 in the outer ring 5 as illustrated in FIG. 3. This bore 56 is best situated in a region of the outer ring 5 slightly shifted along the circumference so that it is disposed not at the lowermost point, but rather at a somewhat higher point of outer ring 5. In this case, when the oil bore 56, which collects the lubricating oil at its lowermost point, is provided in a peripheral groove in the bore of the outer ring 5, an oil level can be maintained in the area between the two rows of rolling elements 8 and 9 in the bearing space. The rolling elements can also be spherical or cylindrical.

In place of the radial groove 34 in the inside contact surface 35 of the ring-shaped flange 17, it is also possible to provide a groove 57 in the external end surface 16 of flange section 11 of the outer ring 5, e.g., by a noncutting, compressive forming of the steel outer ring, before the outer raceways 6, 7 of the ring have been hardened (see FIG. 1).

Finally, the shaft of the bearing according to the invention does not have to be horizontal, it may also have a vertical orientation. In this instance, the radial connecting channel between the flange section of the outer ring, and the ring-shaped flange of the cover, would then extend essentially in a horizontal direction. In this case, it is best to send the lubricating oil at a certain feed pressure through the connecting channel into the storage space of the roller bearing. Accordingly, the radially outer end of the connecting channel in question can be connected to a pressure oil line.

What is claimed is:

1. A bearing assembly for a shaft mounting in a bore of a housing, comprising:

an outer ring having two outer raceways for inner and outer rows of rolling elements, said outer ring including a seating surface section seated in the through-bore and a radially outward-direction flange section, a cover having a contact surface of a ring-shaped flange for sealing off the roller bearing on the outside and at least one oil bore in said outer ring between the two outer raceways, extending radially from the outside toward the inside to a reservoir for the rolling elements to supply or carry away a lubricant to or from the reservoir, characterized in that said outer ring (5) has a lateral surface section (24) of a ring-shaped extension carrying the outside outer raceway (7), said lateral surface section being adjacent to outside end surface (16) of said flange section (11) of said outer ring, on which ring-shaped extension an inner surface (26) of a centering extension (25) is tightly seated, said centering extension being adjacent to said outside surface of the ring-shaped flange (17) of the cover (18, 44);

in that each said oil bore (20,56) is located between said outside end surface (16) of said flange section (11) and said lateral surface section (24) on the circumference of said outer ring (5); and in that each of the said oil bores opens at its radially outer end into a connecting channel (32, 41, 45, 46) between said flange section (11) of said outer ring (5) and said ring-shaped flange (17) of said cover 18,44), said connecting channel extending in an essentially radial direction.

2. Bearing according to claim 1, characterized in that said ring-shaped flange (17) of said cover (18) includes a radial groove (34) formed on the inside contact surface of said flange (17), and said groove (34) includes two side walls (33), and wherein said connecting channel (32, 41) is bounded in the circumferential direction by said two side walls (33) of said radial groove (34) or into the outside end surface (16) of said flange section (11) opposite this bottom surface (35) and the contact surface of said ring-shaped flange (17).

3. Bearing according to claim 1, characterized in that said connecting channel is bounded in the circumferential direction by the two side walls (45) of a radially oriented, continuous axial slot (46, 47) in a sealing disk (48) clamped between the outside end surface (16) of said flange section (11) of said outer ring (5) and the inside contact surface of said ring-shaped flange (17) of said cover (18) and, in axial direction, by the outside end surface (16) and said inside contact surface.

4. Bearing according to claim 1, wherein said shaft is essentially horizontal, characterized in that said oil bore (20) for supplying the lubricating oil is formed in an upper circumferential point on said outer ring (5), and in that said associated connecting channel (32) is essentially vertical and opens out at its upper and into an axial bore (36) passing through said flange section (11) of said outer ring (5) and leading to an oil feed channel (37) in said housing (3).

5. Bearing according to claim 4, characterized in that oil drain opening (38,56), extending from the reservoir (19) to a radially inner edge of the outside end surface (16) of said flange section (11) of said outer ring (5), is located at a lower circumferential point on said outer ring (5), this bore opening into the upper end of an essentially vertical connecting channel (41), which in turn communicates at its lower end with an axial bore (42) passing through said flange section (11) and extending as far as an oil drain channel (43) in said housing (3).

6. Bearing according to claim 5, characterized in that said oil drain opening (38,56) is formed by a lower oil bore (56) worked into said outer ring (5).

7. Bearing according to claim 5, characterized in that said oil drain opening (38,56) is formed by a groove (38) passing continuously in the axial direction from the outside end of said outer ring (5) as far as the radially inner edge of said outside end surface (16) of said flange section (11) of said outer ring (5) between the inner surface (26) of said centering extension (25) of said cover (18) and said lateral surface section (24) of said ring-shaped extension of said outer ring (5).

8. Bearing according to claim 7, characterized in that said groove (38) is worked into said inner surface (26) of said centering extension (25) of said cover (18).

9. Bearing according to claim 7, characterized in that a sealing ring (39) is tightly seated on said inner surface (26) of said centering extension (25) of said cover (18) a certain axial distance away from an outside end of said outer ring (5) and in that a sealing lip of said ring (39) slides on a lateral surface section (40) of an inner ring (28) of said outer row of rolling elements (9).

10. Bearing according to claim 1, characterized in that the lines of force application (21, 22) of said two rows of rolling elements (8,9) diverge from each other at an angle with respect to the axis (23) of said shaft (1).

* * * * *